United States Patent
Wada et al.

(10) Patent No.: US 7,639,583 B2
(45) Date of Patent: Dec. 29, 2009

(54) OPTICAL DISK DEVICE

(75) Inventors: Yasuhiro Wada, Fukuoka (JP);
Hideyuki Fujishima, Fukuoka (JP)

(73) Assignee: Panasonic Corporation, Osaka (JP)

( * ) Notice: Subject to any disclaimer, the term of this patent is extended or adjusted under 35 U.S.C. 154(b) by 365 days.

(21) Appl. No.: 11/739,998

(22) Filed: Apr. 25, 2007

(65) Prior Publication Data

US 2007/0171798 A1  Jul. 26, 2007

(30) Foreign Application Priority Data

Apr. 26, 2006  (JP) .............................. 2006-121477

(51) Int. Cl.
*G11B 7/00* (2006.01)

(52) U.S. Cl. .................................................. 369/53.19

(58) Field of Classification Search .............. 369/53.19, 369/44.32

See application file for complete search history.

(56) References Cited

U.S. PATENT DOCUMENTS

| 5,886,496 | A | * | 3/1999 | Furukawa et al. | ......... | 369/53.19 |
|---|---|---|---|---|---|---|
| 6,411,576 | B1 | * | 6/2002 | Furukawa et al. | ......... | 369/53.19 |
| 6,434,096 | B1 | * | 8/2002 | Akagi et al. | .............. | 369/44.32 |
| 6,680,886 | B1 | * | 1/2004 | Naohara et al. | .......... | 369/44.32 |
| 7,054,241 | B2 | | 5/2006 | Kondo et al. | | |
| 7,327,656 | B2 | * | 2/2008 | Ohno et al. | ............... | 369/53.19 |
| 2003/0147314 | A1 | * | 8/2003 | Kondo et al. | .............. | 369/44.32 |

FOREIGN PATENT DOCUMENTS

| JP | 2003281761 | 10/2003 |
|---|---|---|
| JP | 2005129119 | 5/2005 |
| JP | 2006048824 | 2/2006 |

\* cited by examiner

*Primary Examiner*—Thang V Tran
(74) *Attorney, Agent, or Firm*—Dickinson Wright PLLC

(57) ABSTRACT

An optical disk device that has a tilt correction unit for performing tilt correction to incline the optical axis of laser light based on a tilt between the recording layer of an optical disk and the optical axis of said laser light. The tilt is detected when the optical disk is activated. The optical disk device has a memory for storing a difference in temperature in accordance with the amount of the detected tilt. The difference in temperature is utilized for updating the tilt. The optical disk device engages said tilt correction unit to update said tilt, when a difference in temperature between activation of said optical disk and writing/reading information onto/from said optical disk is detected and when the detected difference in temperature has exceeded the stored difference in temperature corresponding to the amount of the detected tilt.

8 Claims, 9 Drawing Sheets

FIG. 3

| AMOUNT OF TILT DETECTED ON ACTIVATION | < 0.1 | 0.1~0.3 | > 0.3 |
|---|---|---|---|
| THRESHOLD FOR DIFFERENCE IN TEMPERATURE FOR WHICH A TILT IS TO BE UPDATED | ↑ 50°C — 0°C | ↑ 60°C 40°C 20°C 0°C | ↑ 50°C 40°C 30°C 20°C 10°C 0°C |

FIG. 4

| | AMOUNT OF TILT DETECTED ON ACTIVATION | < 0.1 | 0.1~0.3 | > 0.3 |
|---|---|---|---|---|
| ZONE 1 | THRESHOLD FOR DIFFERENCE IN TEMPERATURE FOR WHICH A TILT IS TO BE UPDATED | ↑ 50°C — 0°C | ↑ 60°C — 40°C — 20°C — 0°C | ↑ 50°C — 40°C — 30°C — 20°C — 10°C — 0°C |

| | AMOUNT OF TILT DETECTED ON ACTIVATION | < 0.2 | 0.2~0.4 | > 0.4 |
|---|---|---|---|---|
| ZONE 2 | THRESHOLD FOR DIFFERENCE IN TEMPERATURE FOR WHICH A TILT IS TO BE UPDATED | ↑ 50°C — 0°C | ↑ 60°C — 40°C — 20°C — 0°C | ↑ 50°C — 40°C — 30°C — 20°C — 10°C — 0°C |

| | AMOUNT OF TILT DETECTED ON ACTIVATION | < 0.3 | 0.3~0.5 | > 0.5 |
|---|---|---|---|---|
| ZONE 3 | THRESHOLD FOR DIFFERENCE IN TEMPERATURE FOR WHICH A TILT IS TO BE UPDATED | ↑ 50°C — 0°C | ↑ 60°C — 40°C — 20°C — 0°C | ↑ 50°C — 40°C — 30°C — 20°C — 10°C — 0°C |

FIG. 5 (A)

| ZONE | 1 | 2 | 3 | 4 |
|------|------|------|------|------|
| TILT | 0.05 | 0.15 | 0.20 | 0.05 |

↑ LARGEST TILT

FIG. 5 (B)

| LARGEST TILT | < 0.1 | 0.1~0.3 | > 0.3 |
|---|---|---|---|
| THRESHOLD FOR DIFFERENCE IN TEMPERATURE FOR WHICH A TILT IS TO BE UPDATED | 0°C – 50°C | 0°C – 60°C | 0°C – 50°C |

FIG. 6 (A)

| ZONE | 1 | 2 | 3 | 4 |
|---|---|---|---|---|
| TILT | 0.05 | 0.15 | 0.2 | 0.25 |

FIG. 6 (B)

| DIFFERENCE OF TILT BETWEEN ZONE 1 AND ZONE 4 | < 0.1 | 0.1~0.3 | > 0.3 |
|---|---|---|---|
| THRESHOLD FOR DIFFERENCE IN TEMPERATURE FOR WHICH A TILT IS TO BE UPDATED | ↑ 50°C — 0°C | ↑ 60°C 40°C 20°C 0°C | ↑ 50°C 40°C 30°C 20°C 10°C 0°C |

FIG. 8 (A)

| ZONE | 1 | 2 | 3 | 4 |
|---|---|---|---|---|
| FIRST TILT | 0.05 | 0.15 | 0.20 | 0.25 |
| SECOND TILT | 0.05 | 0.20 | 0.25 | 0.40 |
| DIFFERENCE BETWEEN THE FIRST TILT AND THE SECOND TILT | 0.00 | 0.05 | 0.05 | 0.15 |

FIG. 8 (B)

| DIFFERENCE BETWEEN THE FIRST TILT AND THE SECOND TILT | < 0.1 | 0.1～0.3 | > 0.3 |
|---|---|---|---|
| THRESHOLD FOR DIFFERENCE IN TEMPERATURE FOR WHICH THE FIRST TILT IS TO BE UPDATED | 0°C – 50°C | 0°C – 60°C (20°C, 40°C) | 0°C – 50°C (10°C, 20°C, 30°C, 40°C) |

OPTICAL DISK DEVICE

BACKGROUND

1. Field of the Invention

The present invention relates to an optical disk device that makes control so that the data recording layer of an optical disk will be perpendicular to the optical axis of laser light irradiated onto the optical disk.

2. Description of the related art

As long as the optical axis of laser light irradiated from an optical pickup is constantly perpendicular to the target data recording layer of an optical disk, the laser light formed for recording/reproduction on the track of the optical disk is correctly focused on the data recording surface. Coma does not occur so that the beam spot diameter of laser light is smallest on the data recording layer so that sufficient read/write quality is obtained.

An optical disk may be subjected to distortion or warp in accordance with various process conditions or management state such as the temperature, pressure or cooling period during its resin molding. Such an optical disk is accompanied by a problem of tilt that the optical axis of laser light irradiated from an optical pickup is not perpendicular to the target data recording layer of an optical disk. When the permissible tilt range of the optical pickup mounted on the optical disk device is exceeded, proper read/write action is disabled, which causes an error during recording or reproduction thus resulting in degradation in the read/write quality.

In order to solve such a problem, a tilt correction method is in use for detecting a tilt in a predetermined area of an optical disk on activation before read/write operation and inclining the optical axis of laser light in accordance with the tilt to correct the tilt.

In accordance with an optical disk, a rise in the temperature in an optical disk device causes a change in the tilt compared with the activation before read/write operation. For example, as shown in the tilt correction flowchart of FIG. 9 supporting a change in temperature (Patent Reference 1), there has been a technique that constantly detects the temperature in the optical disk device by using a temperature sensor provided in an optical disk device, determines whether the change in the temperature has exceeded a predetermined threshold (S101), and in case it is determined that the change in the temperature has exceeded the predetermined threshold, detects a dc component of a focus driving signal (S101) and stores into a memory the relation between the detection result and the radial position (S103). Based on the stored numeric data, the technique re-computes and updates a distortion function and a tilt approximation function (S104) and generates and constantly outputs a tilt driving signal in the current radial position (S105).

With the outputted tilt driving signal, the objective lens of the optical pickup is inclined and the optical axis of the recording layer of the optical disk becomes perpendicular to the optical axis of laser light thus assures favorable recording and reproduction.

In other words, a method has been proposed that detects a tilt again in the presence of a change in temperature and appropriately control tilt correction thus assuring favorable recording and reproduction.

While not shown, another related art technology, a method is proposed that divides an optical disk into a plurality of zones in its radial direction and, in case it is determined that a change in temperature during recording/reproduction with respect to the temperature stored for each zone has exceeded a predetermined threshold, detects a tilt again for each zone and performs tilt correction based on the result (Patent Reference 2).

According to another related art technology, another method is proposed that detects a tilt in the area on the inner circumference alone to perform tilt correction on activation before read/write operation is started. This shortens the time required for activation as well as checks the presence of saved data per area and per temperature when a predetermined change in temperature occurred to determine whether detection of a tilt is required again, thus performing tilt correction more efficiently.

Patent Reference 1: JP-A-2003-281761 (FIG. 26 on Page 37)

Patent Reference 2: JP-A-2005-129119 (FIG. 2 on Page 2)

Patent Reference 3: JP-A-2006-48824 (FIG. 2 on Page 12)

However, in the related art technique, even in the quality of an optical disk is good and distortion of the optical disk is small so that the optical disk is less subject to a change in the optical disk device and is within a permissible tilt range of the optical pickup mounted on the optical disk device, a tilt in a predetermined area is detected and tilt correction is made to offset the tilt each time the change in the temperature has exceeded a predetermined threshold. This prevents processing required for intended recording/reproduction operation from being performed smoothly thus resulting in worse efficiency.

In particular, with an optical disk device, each element such as a spindle motor, a feed motor, a laser diode, or a driving circuit is heated due to its energy consumption during operation after power on. The temporal change in the temperature is large. In case only a temperature width of a temperature threshold value has a small value, the recording/reproduction may be subjected to a being influence when the interruption processing time exceeds the capacity of a buffer memory for temporarily saving recording/reproduction data.

SUMMARY

The invention has been accomplished to solve the related art problems. An object of the invention is to provide an optical disk device capable of performing tilt correction to incline the optical axis of laser light to a proper angle even in the presence of an increase in the warp or distortion of an optical disk caused by a rise in temperature after the optical disk is activated.

In order to attain the object, the invention provides an optical disk device that has a tilt correction unit for performing tilt correction to incline the optical axis of laser light based on a tilt between the recording layer of an optical disk and the optical axis of said laser light. The tilt is detected when the optical disk is activated. The optical disk device has a memory for storing a difference in temperature in accordance with the amount of the detected tilt. The difference in temperature is utilized for updating the tilt. The optical disk device engages said tilt correction unit to update said tilt, when a difference in temperature between activation of said optical disk and writing/reading information onto/from said optical disk is detected and when the detected difference in temperature has exceeded the stored difference in temperature corresponding to the amount of the detected tilt.

The optical disk device according to the invention updates a tilt in case the difference in temperature between activation of an optical disk and writing/reading information onto/from an optical disk has exceeded a predetermined difference in temperature corresponding to the amount of a tilt detected when the optical disk is activated thus performing tilt correction that considers a rise in temperature of an optical disk after activation of an optical disk. It is thus possible to perform tilt correction to incline the optical axis of laser light to a proper angle even in case distortion or warp of an optical disk has increased due to a rise in temperature after the optical disk is activated.

BRIEF DESCRIPTION OF THE DRAWINGS

FIG. 3 is a table showing thresholds for differences in temperature to perform update of a tilt in accordance with the amount of a tilt detected on activation of an optical disk device according to Embodiment 1 of the invention.

FIG. 4 is a table showing thresholds for differences in temperature to perform update of a tilt in accordance with the amount of a tilt detected on activation per zone divided in the radial direction of an optical disk.

FIG. 5(a) is a table showing the largest tilt among the tilts per zone divided in the radial direction of an optical disk.

FIG. 5(b) is a table showing thresholds for differences in temperature to perform update of a tilt in accordance with the amount of the largest tilt.

FIG. 6(a) is a table showing a tilt per zone divided in the radial direction of an optical disk.

FIG. 6(b) is a table showing thresholds for differences in temperature to perform update of a tilt in accordance with the amount of a tilt between Zone 1 and Zone 4.

FIG. 8(a) is a table showing the amount of the difference between the first tilt and the second tilt detected on activation of an optical disk device per zone according to Embodiment 2 of the invention.

FIG. 8(b) is table showing thresholds for differences in temperature to perform update of the first tilt in accordance with the amount of the difference between the first tilt and the second tilt.

DETAILED DESCRIPTION

Embodiments of the invention will be described referring to drawings.

EMBODIMENT 1

Figure 1:
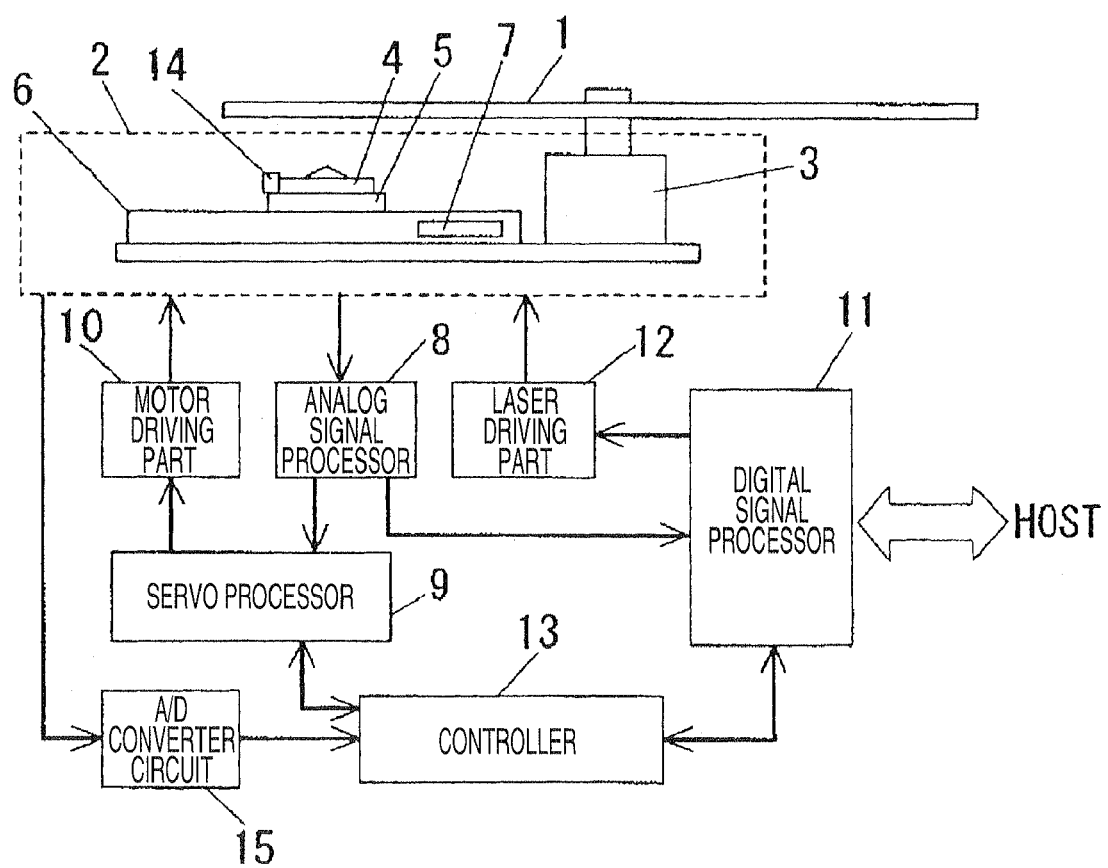
FIG. 1 is a block diagram of an optical disk device according to Embodiment 1 of the invention.
Figure 2:
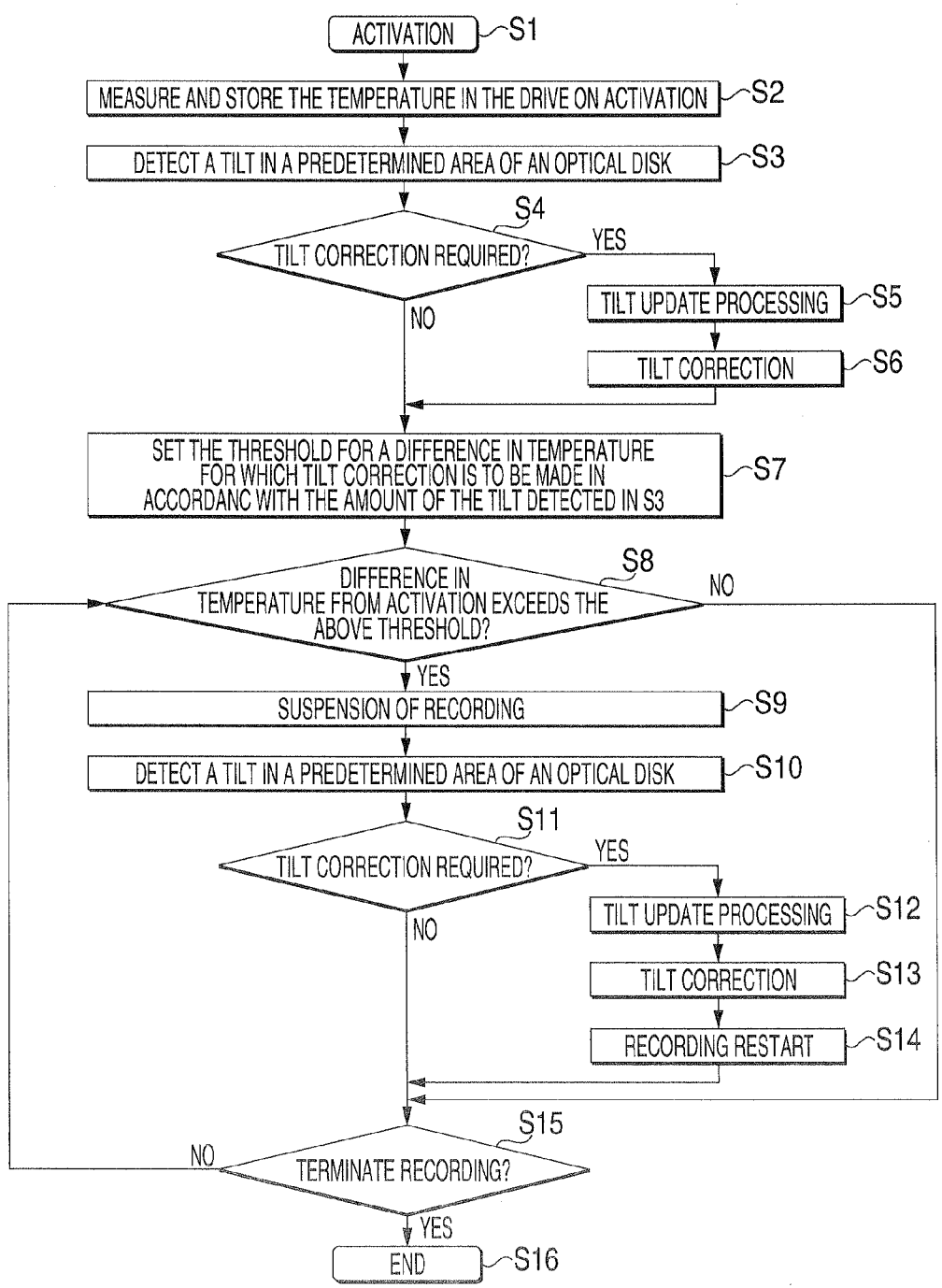
FIG. 2 is a flowchart showing the procedure of tilt correction of an optical disk device according to Embodiment 1 of the invention.

FIG. 1 is a block diagram of an optical disk device according to Embodiment 1 of the invention. FIG. 2 is a flowchart showing the procedure of tilt correction of an optical disk device according to Embodiment 1 of the invention. FIG. 3 is a table showing thresholds for differences in temperature to perform update of a tilt in accordance with the amount of a tilt detected on activation of an optical disk device according to Embodiment 1 of the invention. FIG. 4 is a table showing thresholds for differences in temperature to perform update of a tilt in accordance with the amount of a tilt detected on activation per zone divided in the radial direction of an optical disk. FIG. 5(a) is a table showing the largest tilt among the tilts per zone divided in the radial direction of an optical disk. FIG. 5(b) is a table showing thresholds for differences in temperature to perform update of a tilt in accordance with the amount of the largest tilt. FIG. 6(a) is a table showing a tilt per zone divided in the radial direction of an optical disk. FIG. 6(b) is a table showing thresholds for differences in temperature to perform update of a tilt in accordance with the amount of a tilt between Zone 1 and Zone 4.

As shown in FIG. 1, the optical disk device comprises a recording layer; a pickup module 2 arranged below an optical disk 1 capable of recording/reproducing information; and a spindle motor 3 mounted on the pickup module 2 that gives a rotary driving power to variably rotate the optical disk 1 or rotate the same at a constant speed.

An optical pickup 4 of the optical pickup module 2 including an objective lens, mounted on a carriage 5, irradiates laser light onto the optical disk 1 to write (record) information onto a predetermined area of the optical disk 1 or read (reproduce) information based on the reflected light of the irradiated laser light. The carriage 5 is driven by a feed part 6 and reciprocates in the radial direction of the optical disk 1.

The feed part 6 includes a feed motor 7 for driving the carriage 5, a gear (not shown), and a screw shaft (not shown) arranged thereon. The feed motor 7 is rotated so that the carriage 5 will reciprocate between the inner circumference and outer circumference as the radial direction of the optical disk 1.

The pickup module 2 of a compact/low-profile optical disk device is composed of the above key components.

An analog signal processor 8 generates a focus error signal and a tracking error signal based on an output signal from a photo-sensor (not shown) inside the optical pickup 4 mounted on the carriage 5 in the pickup module 2 and outputs the signals to a servo processor 9 that drives a three-axis actuator of the optical pickup 4.

The servo processor 9 is composed of an A/D converter for converting an analog signal transmitted from the analog signal processor 8 to a digital signal, a memory for temporarily storing the digital signal converted by the A/D converter, an arithmetic circuit for performing arithmetic operation, by using a predetermined method, on a digital signal stored in the memory or transmitted from the A/D converter, and a D/A converter for converting a digital signal obtained by arithmetic operation in the arithmetic circuit. The servo processor 9 performs filter signal processing and various types of arithmetic processing by way of digital arithmetic operation so that the beam spot of laser light formed on the data recording layer of the optical disk 1 will accurately follow the information track of the optical disk 1.

The servo processor 9 makes control, that is, moves an objective lens (not shown) on the optical pickup 4 in the focus direction or tracking direction via a motor driving part 10 as well as makes transfer control over the feed part 6 or rotation control over the motor 3.

The servo processor 9 makes various types of parameter setting or sequence control in a flexible way based on a command from a controller 13.

During reproduction operation, the servo processor 9 irradiates laser light onto the optical disk 1 from the optical pickup 4, receives a reflected light from the optical disk 1 on a photo-sensor (not shown), and supplies a reproduction signal corresponding to the received reflected light to a digital signal processor 11 composed of a data slicer, a data PLL circuit, a jitter measurement circuit, an error correction part, and a modulator, a demodulator, a buffer memory and a laser controller via the analog signal processor 8. The signal outputted from the digital signal processor 11 is transferred to the host (HOST in FIG. 1) as effective data for reproduction.

During recording operation, the servo processor 9 modulates data transmitted from the host by using a digital signal processor 11, supplies a predetermined driving current to a light source such as a laser (not shown) mounted in the optical pickup 4 via a laser driving part 12, and causes the light source to emit light in a shape such as a pulse to record information on the information track of the optical disk 1.

A temperature sensor 14 mounted on the carriage 5 is designed to detect the temperature in the optical disk device. The temperature sensor 14 detects the temperature before information is recorded or reproduced onto/from the optical disk 1 already inserted in the optical disk device, or the temperature on activation or during recording/reproduction of data.

The analog output from the temperature sensor 14 is A/D-converted in the A/D converter circuit 15 and is outputted to the controller 13, which performs tilt detection and tilt correction described later.

That is, the controller 13 controls the entire optical disk device thus configured.

Description is made referring to FIG. 2.

An optical disk 1 is mounted on an optical disk device. When turned on, the optical disk device is immediately activated (S1) and the temperature on activation in the optical disk device is detected by the temperature sensor 14 described earlier and the detected value is stored into a memory as a temperature on activation (S2).

Next, the optical disk 1 is driven to rotate at a predetermined rotation speed by a spindle motor 3. A predetermined area of the optical disk 1 is sought by the optical pickup. Laser light is irradiated, in a free-running state where only focus control is operated, onto the optical disk at least at two points, and the tilt in the area is detected by using a focus driving signal based on the output signal from the photo-sensor that has received the reflected light of the laser light (S3).

By comparing the amount of the detected tilt with a preset threshold, it is determined whether tilt correction is required (S4). In case the threshold is exceeded, tilt update processing (S5) is made and then tilt correction (S6) is followed. In correspondence to the detected tilt, a threshold for a difference in temperature previously stored is set (S7).

In case the amount of the detected tilt is compared with a preset threshold and does not exceed the threshold (S8), a preset threshold for the difference in temperature for which tilt correction is to be performed is set (S7) in accordance with the detected tilt without performing the tilt update processing (S5) or tilt correction (S6).

It is determined whether the difference in temperature compared with the activation time exceeds the preset threshold for temperature for which tilt correction is to be made (S8), and in case the threshold is exceeded, recording is temporarily suspended (S9) and the tilt in the predetermined area of the optical disk is detected (S10).

By comparing the amount of the detected tilt with a preset threshold, it is determined whether tilt correction is required (S11). In case the threshold is exceeded, tilt update processing (S12) is made and then tilt correction (S13) is followed. After recording restart (S14) is made, it is determined whether to terminate the recording (S15).

It is determined whether the difference in temperature from the activation time exceeds the preset threshold for the difference in temperature for which the tilt correction is to be made (S8). In case the threshold is not exceeded, it is determined whether to terminate the recording (S15) without performing steps S9 to S14.

In case it is determined that the recording is not terminated as a result of whether to terminate the recording (S15), it is determined again whether the difference in temperature from the activation time exceeds the preset threshold for the difference in temperature for which the tilt correction is to be made (S8) and the steps S8 to S15 are repeated.

In case it is determined that the recording is to be terminated while the processing is underway, the recording terminates normally (S16).

A preset threshold for the difference in temperature for which the tilt correction is to be made will be described referring to FIG. 3.

As understood from FIG. 3, thresholds for the differences in temperature for which a tilt is to be updated, that is, thresholds for the differences in temperature for which a tilt is to be updated based on the difference in temperature between activation of an optical disk and recording of information onto the optical disk, are classified and stored into three ranges corresponding to the amount of each tilt, in accordance with the amount of tilt detected on activation in the predetermined area of the optical disk in S3.

In case the amount of a tilt detected on activation is smaller than 0.1, thresholds for differences in temperature for which a tilt is to be updated are set in steps of 50° C. In case the amount of a tilt detected on activation is within the range of 0.1 to 0.3, thresholds for differences in temperature for which a tilt is to be updated are set in steps of 20° C. In case the amount of a tilt detected on activation is greater than 0.3, thresholds for differences in temperature for which a tilt is to be updated are set in steps of 10° C.

Thus, the intervals between differences in temperature differ with respective ranges. The interval between differences in temperature for which a tilt is to be updated is changed in accordance with the amount of a tilt detected when an optical disk is activated. Thus, a larger interval may be set between differences in temperature for which a tilt is to be updated for a good-quality optical disk with smaller distortion or warp, thus reducing the time required for tilt detection or tilt correction that necessarily interrupts recording/reproduction.

A smaller interval may be set between differences in temperature for which a tilt is to be updated for a poor-quality optical disk with larger distortion or warp. This provides control supporting a change in temperature corresponding to more detailed levels of distortion or warp, thus allowing tilt correction that depends on the quality of an optical disk.

In other words, a tilt is updated in case the difference in temperature between activation of an optical disk and writing/reading of information onto/from an optical disk has exceeds a predetermined difference in temperature corresponding to the amount of tilt detected when the optical disk is activated. This approach provides tilt correction that considers a rise in temperature of an optical disk after activation of an optical disk. With this method, tilt correction to incline the optical axis of laser light to a proper angle even in case distortion or warp of an optical disk has increased due to a rise in temperature after the optical disk is activated.

As understood from FIG. 4, an optical disk is divided into three zones, Zone 1 to Zone 3, in the radial direction. Threshold for updating a tilt, that is, thresholds for differences in temperature for which a tilt is to be updated based on the difference in temperature between activation of an optical disk and recording of information onto an optical disk are stored in three ranges corresponding to the three zones.

For Zone 1, in case the amount of a tilt detected on activation is smaller than 0.1, thresholds for differences in temperature for which a tilt is to be updated are set in steps of 50° C. In case the amount of a tilt detected on activation is within the range of 0.1 to 0.3, thresholds for differences in temperature for which a tilt is to be updated are set in steps of 20° C. In case the amount of a tilt detected on activation is greater than 0.3, thresholds for differences in temperature for which a tilt is to be updated are set in steps of 10° C.

For Zone 2, in case the amount of a tilt detected on activation is smaller than 0.2, thresholds for differences in temperature for which a tilt is to be updated are set in steps of 50° C. In case the amount of a tilt detected on activation is within the range of 0.2 to 0.4, thresholds for differences in temperature for which a tilt is to be updated are set in steps of 20° C. In case the amount of a tilt detected on activation is greater than 0.4, thresholds for differences in temperature for which a tilt is to be updated are set in steps of 10° C.

For Zone 3, in case the amount of a tilt detected on activation is smaller than 0.3, thresholds for differences in temperature for which a tilt is to be updated are set in steps of 50° C. In case the amount of a tilt detected on activation is within the range of 0.3 to 0.5, thresholds for differences in temperature for which a tilt is to be updated are set in steps of 20° C. In case the amount of a tilt detected on activation is greater than 0.5, thresholds for differences in temperature for which a tilt is to be updated are set in steps of 10° C.

Thus, the intervals between differences in temperature differ with respective ranges. The interval between differences in temperature for which a tilt is to be updated is changed in accordance with the amount of a tilt detected when an optical disk is activated. Thus, a smaller interval may be set between differences in temperature for which a tilt is to be updated for a zone that is expected to show a greater change in tilt caused by a rise in temperature, thereby allowing detailed tilt correction.

FIG. 5(*a*) shows an optical disk divided into four zones, Zone 1 to Zone 4, in the radial direction. The figure shows a tilt detected on activation detected for each zone. It is understood that the largest tilt is 0.2 in Zone 3.

As understood from FIG. 5(*a*), thresholds for the differences in temperature for which a tilt is to be updated, that is, thresholds for the differences in temperature for which a tilt is to be updated based on the difference in temperature between activation of an optical disk and recording of information onto the optical disk, are classified and stored into three ranges corresponding to the amount of the largest tilt, in accordance with the amount of detected tilt detected on activation.

Thus, the intervals between differences in temperature differ with the respective largest tilts. The interval between differences in temperature for which a tilt is to be updated is changed in accordance with the amount of the largest tilt detected when an optical disk is activated. Thus, it is possible to readily detect an optical disk with a warp of a waveform shape instead of a straight warp. More minute tilt correction of such a disk is available.

FIG. 6(*a*) shows an optical disk divided into four zones, Zone 1 to Zone 4, in the radial direction. The figure shows a tilt detected on activation for each zone. It is understood that the amount of the difference between Zone 1 and Zone 4 is 0.2.

As understood from FIG. 6(*b*), thresholds for the differences in temperature for which a tilt is to be updated, that is, thresholds for the differences in temperature for which a tilt is to be updated based on the difference in temperature between activation of an optical disk and recording of information onto the optical disk, are classified and stored into three ranges corresponding to the amount of the difference in the tilt between Zone 1 and Zone 4, in accordance with the difference in the amount of tilt detected on activation between Zone 1 and Zone 4.

Thus, the intervals between differences in temperature differ with respective ranges of differences in tilt between Zone 1 and Zone 4. The interval between differences in temperature for which a tilt is to be updated is changed in accordance with the amount of a tilt detected when an optical disk is activated between Zone 1 and Zone 4. Thus, it is possible to readily detect an optical disk with a warp of a large shape bent in the midway instead of a straight warp. More minute tilt correction of such a disk is available.

Especially in this case, assuming that Zone 1 is the zone at the innermost circumference detected when the optical disk is activated and Zone 4 the zone at the outermost circumference, it is readily possible to detect an optical disk with a large warp on the inner or outer circumference alone instead of a straight warp. More minute tilt correction of such a disk is available.

EMBODIMENT 2

Figure 7:
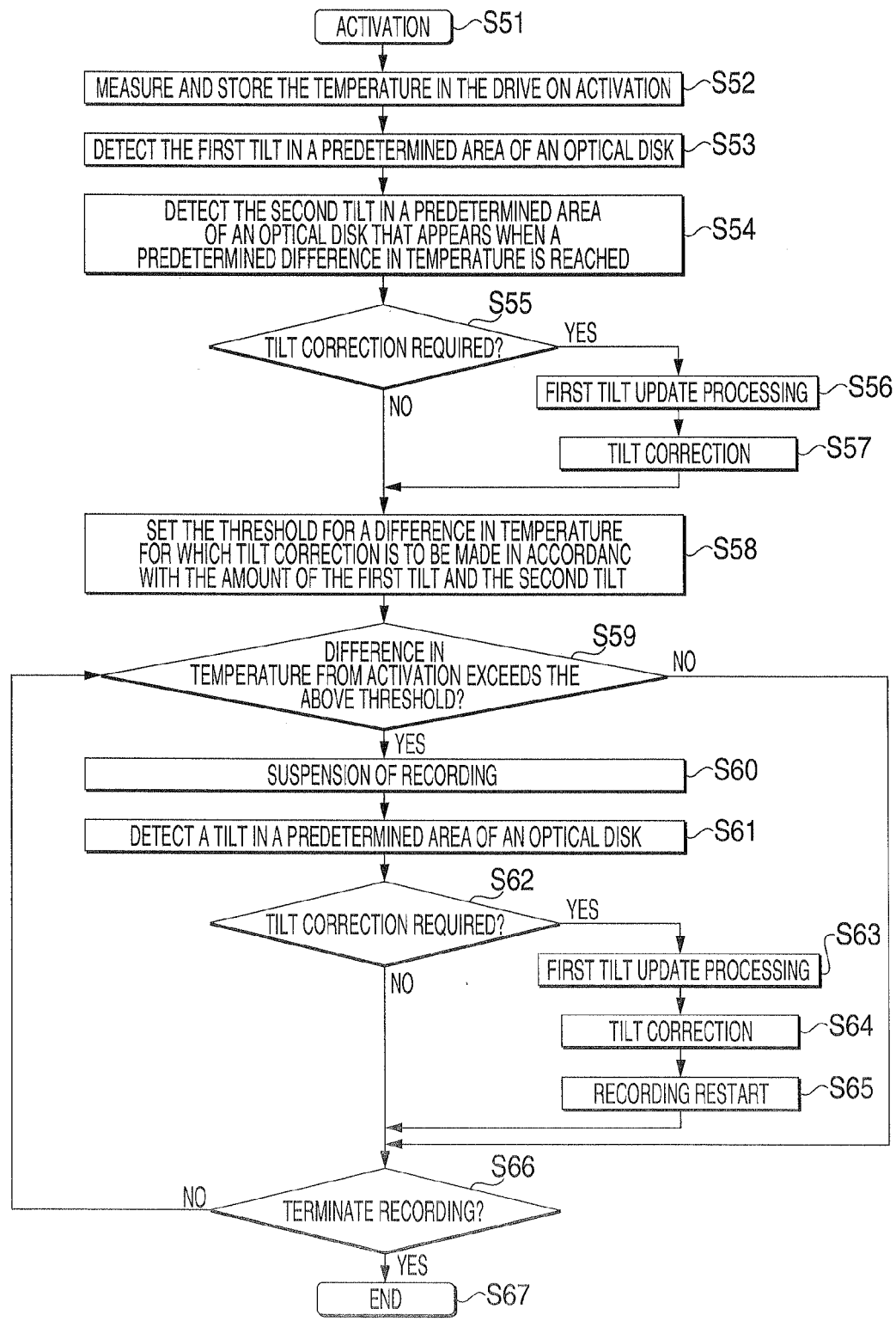
FIG. 7 is a flowchart showing the procedure of tilt correction of an optical disk device according to Embodiment 2 of the invention.
Figure 9:
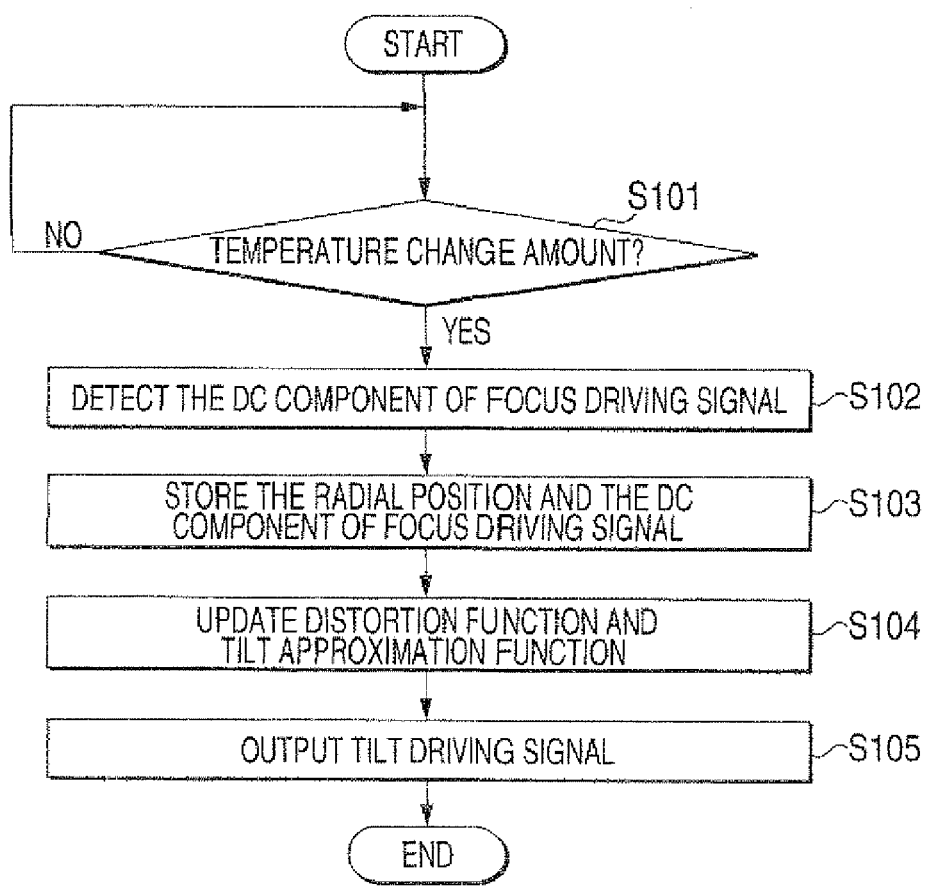
FIG. 9 is a flowchart of tilt correction supporting a change in temperature disclosed in (Patent Reference 1).

The block diagram according to FIG. 2 is omitted because it is the same as that in FIG. 1. FIG. 7 is a flowchart showing the procedure of tilt correction of an optical disk device according to Embodiment 2 of the invention. FIG. 8(*a*) is a table showing the amount of the difference between the first tilt and the second tilt detected on activation of an optical disk device per zone according to Embodiment 2 of the invention. FIG. 8(*b*) is a table showing thresholds for differences in temperature to perform update of the first tilt in accordance with the amount of the difference between the first tilt and the second tilt.

Description will be made referring to FIG. 7.

An optical disk 1 is mounted on an optical disk device. When the optical disk device is activated, the optical disk 1 is immediately activated (S1) and the temperature on activation in the optical disk device is detected by the temperature sensor 14 described earlier and the detected value is stored into a memory as a temperature on activation (S52).

Next, the optical disk 1 is driven to rotate at a predetermined rotation speed by a spindle motor 3. A predetermined area of the optical disk 1 is sought by the optical pickup 4. Laser light is irradiated, in a free-running state where only focus control is operated, onto the optical disk at least at two points, and the tilt in the area is detected by using a focus driving signal based on the output signal from the photosensor that has received the reflected light of the laser light (S53).

When the difference in temperature from that of the optical disk has reached a predetermined difference in temperature, the second tilt is detected in the same area (S54).

By comparing the amount of the detected first tilt with a preset threshold, it is determined whether tilt correction is required (S55). In case the threshold is exceeded, the first tilt update processing (S56) is made and then tilt correction (S57) is followed. In correspondence to the difference between the first tilt and the second tilt, a threshold for a difference in temperature previously stored is set (S58).

In case the amount of the detected first tilt is compared with a preset threshold and does not exceed the threshold, a preset threshold for the difference in temperature for which tilt correction is to be performed is set (S58) in accordance with the amount between the first tilt and the second tilt without performing the first tilt update processing (S56) or tilt correction (S57).

It is determined whether the difference in temperature compared with the activation time exceeds the preset threshold for temperature for which tilt correction is to be made (S59), and in case the threshold is exceeded, recording is temporarily suspended (S60) and the tilt in the predetermined area of the optical disk is detected (S61).

By comparing the amount of the detected tilt with a preset threshold, it is determined whether tilt correction is required (S62). In case the threshold is exceeded, the first tilt update processing (S63) is made and then tilt correction (S64) is followed. After recording restart (S65) is made, it is determined whether to terminate the recording (S66).

It is determined whether the difference in temperature from the activation time exceeds the preset threshold for the difference in temperature for which the tilt correction is to be made (S59). In case the threshold is not exceeded, it is determined whether to terminate the recording (S66) without performing steps S60 to S65.

In case it is determined that the recording is not terminated as a result of whether to terminate the recording (S66), it is determined again whether the difference in temperature from the activation time exceeds the preset threshold for the difference in temperature for which the tilt correction is to be made (S59) and the steps S60 to S65 are repeated.

In case it is determined that the recording is to be terminated while the processing is under way, the recording terminates normally (S67).

As understood from FIG. 8, thresholds for the differences in temperature for which the first tilt is to be updated, that is, thresholds for the differences in temperature for which the first tilt is to be updated based on the difference in temperature between activation of an optical disk and recording of information onto the optical disk, are classified and stored into three ranges corresponding to the amount of the difference between the first tilt and the second tilt.

In case the amount of the difference between the first tilt and the second tilt is smaller than 0.1, thresholds for differences in temperature for which the first tilt is to be updated are set in steps of 50° C. In case the amount of a tilt detected on activation is within the range of 0.1 to 0.3, thresholds for differences in temperature for which a tilt is to be updated are set in steps of 20° C. In case the amount of a tilt detected on activation is greater than 0.3, thresholds for differences in temperature for which a tilt is to be updated are set in steps of 10° C.

Thus, the intervals between differences in temperature differ with respective ranges. The interval between differences in temperature for which the first tilt is to be updated is changed in accordance with the amount of the difference between the first tilt and the second tilt detected when an optical disk is activated. With this method, tilt correction to incline the optical axis of laser light to a proper angle even in case distortion or warp of an optical disk has increased due to a rise in temperature after the optical disk is activated.

In this case, an optical disk is divided into a plurality of zones in the radial direction. A difference in temperature for which the first tilt is to be updated in accordance with the amount of the difference between the first tilt and the second tilt detected on activation of an optical disk is stored per zone. It is thus possible to narrow down the interval between differences in temperature for which the first tilt is to be updated per zone in accordance with a change in the tilt due to a rise in temperature after activation, thus providing more minute tilt correction.

While writing (recording) of information onto an optical disk is described in the foregoing embodiments, the same processing may be used for reading (reproducing) of information from an optical disk also.

This application is based upon and claims the benefit of priority of Japanese Patent Application No 2006-121477 filed on Jun. 4, 1926, the contents of which are incorporated herein by reference in its entirety.

What is claimed is:

1. An optical disk device comprising:
   a tilt correction unit for performing tilt correction to incline the optical axis of laser light based on a tilt between the recording layer of an optical disk and the optical axis of said laser light, the tilt being detected when the optical disk is activated; and
   a memory for storing a difference in temperature in accordance with the amount of the detected tilt, the difference in temperature being utilized for updating the tilt;
   wherein said optical disk device engages said tilt correction unit to update said tilt, when a difference in temperature between activation of said optical disk and writing/reading information onto/from said optical disk is detected and when the detected difference in temperature has exceeded the stored difference in temperature corresponding to the amount of the detected tilt.

2. The optical disk device according to claim 1, wherein the memory stores a plurality of the amounts of the tilts, each of the plurality of the amounts of the tilts being detected when the optical disk is activated, and stores a plurality of differences in temperature corresponding to each of the plurality of the amounts of the tilts.

3. The optical disk device according to claim 1, wherein said optical disk is divided into a plurality of zones in the radial direction and that said memory stores per said zone a difference in temperature to update said tilt in accordance with the amount of a tilt detected on activation of said optical disk.

4. The optical disk device according to claim 1, wherein said optical disk is divided into a plurality of zones in the radial direction and that said memory stores a difference in temperature to update said tilt in accordance with the amount of the largest tilt among said tilts for each of said zones detected on activation of said optical disk.

5. The optical disk device according to claim 1, wherein said optical disk is divided into a plurality of zones in the radial direction and that said memory stores a difference in temperature to update said tilt in accordance with the amount of the difference between the tilts in any two zones among said tilts for each of said zones detected on activation of said optical disk.

6. The optical disk device according to claim 1, wherein said memory stores a difference in temperature to update said tilt in accordance with the amount of the difference between the tilt in a zone at the innermost circumference and the tilt in a zone at the outermost circumference detected on activation of said optical disk.

7. An optical disk device comprising:
   a tilt detection unit for detecting a first tilt between the recording layer of an optical disk and the optical axis of laser light detected when an optical disk is activated and a second tilt detected when a difference in temperature between activation of said optical disk and writing/reading information onto/from said optical disk has reached a predetermined difference in temperature;
   a tilt correction unit for performing tilt correction to incline the optical axis of said laser light based on said first tilt;
   a temperature detection unit for detecting the difference in temperature between activation of said optical disk and writing/reading information onto/from said optical disk;

a memory for storing a difference in temperature to update said first tilt in accordance with the amount of the difference between said first tilt and said second tilt; and a controller for engaging said tilt correction unit to update said first tilt in case said detected difference in temperature has exceeded a difference in temperature corresponding to the amount of the difference between said first tilt and said second tilt.

8. The optical disk device according to claim 7, wherein said optical disk is divided into a plurality of zones in the radial direction and that said memory stores for each of said zones a difference in temperature to update said first tilt in accordance with the amount of the difference between said first tilt and said second tilt.

* * * * *